United States Patent
Iovine et al.

(10) Patent No.: US 7,596,135 B1
(45) Date of Patent: Sep. 29, 2009

(54) METHOD AND APPARATUS FOR MIXED-CAST ROUTING THROUGH A CLOS-LIKE NETWORK

(75) Inventors: Ronald Iovine, Allen, TX (US); Weiqing Cai, Dallas, TX (US)

(73) Assignee: Cisco Technology, Inc., San Jose, CA (US)

( * ) Notice: Subject to any disclaimer, the term of this patent is extended or adjusted under 35 U.S.C. 154(b) by 765 days.

(21) Appl. No.: 10/444,438

(22) Filed: May 23, 2003

(51) Int. Cl.
*H04L 12/50* (2006.01)
(52) U.S. Cl. .......................... 370/388; 370/461
(58) Field of Classification Search ................ 370/238, 370/388, 465, 386
See application file for complete search history.

(56) References Cited

U.S. PATENT DOCUMENTS

| | | | |
|---|---|---|---|
| 5,291,477 A * | 3/1994 | Liew | 370/238 |
| 5,451,936 A | 9/1995 | Yang et al. | 340/826 |
| 5,801,641 A | 9/1998 | Yang et al. | 340/826 |
| 7,180,908 B2 * | 2/2007 | Valavi et al. | 370/465 |
| 2004/0114616 A1 * | 6/2004 | Wang | 370/412 |

OTHER PUBLICATIONS

Skeie, Tor et al., "Scalable Non-Blocking Networks With Fixed Size Routers".

* cited by examiner

*Primary Examiner*—Jayanti K Patel
*Assistant Examiner*—Jung Park
(74) *Attorney, Agent, or Firm*—Edell, Shapiro & Finnan, LLC

(57) ABSTRACT

Methods and apparatus for routing mixed cast requests through a Clos-like network are disclosed. According to one aspect of the present invention, a method for processing a routing request within a network system includes computing costs associated with input links between a center stage and an input stage and computing costs associated with output links between the center stage and an output stage. The method also includes comparing the costs associated with the input links and the costs associated with the output links to identify a first input link, a first output link, and a second output link. The first output link is associated with a first center stage node and the second output link is associated with a second center stage node. The request is routed using the first input link, the first output link, and the second output link.

15 Claims, 10 Drawing Sheets

METHOD AND APPARATUS FOR MIXED-CAST ROUTING THROUGH A CLOS-LIKE NETWORK

BACKGROUND OF THE INVENTION

1. Field of Invention

The present invention relates generally to network systems. More particularly, the present invention relates to enabling unicast and multicast connection requests to be routed through a Clos-like network such that bandwidth is preserved and utilized efficiently.

2. Description of the Related Art

The demand for data communication services is growing at an explosive rate. Much of the increased demand is due to the fact that more residential and business computer users are becoming connected to the Internet. Furthermore, the types of traffic being carried by the Internet are shifting from lower bandwidth applications towards high bandwidth applications which include voice traffic and video traffic.

Within a network, data may be transmitted between nodes, i.e., network elements such as switches. For example, data or information which originates at port associated with a source node may be routed to a port associated with a destination node. Often, the data may be routed through intermediate nodes. In other words, rather than being routed substantially directly from a source node to a destination node, data may be routed from the source node to at least one intermediate or center node before the data is routed to the destination node.

At times, data that is to be routed or transmitted may be blocked within a network. When blocking occurs in a network, data that is intended to be transmitted from one node to another node, e.g., via at least one center node, may be prevented from being successfully transmitted. As such, whenever possible, non-blocking networks are designed. In the design of non-blocking networks, Clos networks are widely used. A Clos network or matrix is generally a multi-stage interconnect in which each switch in each stage is connected to each switch in a successive stage by exactly one link. One particularly useful Clos network is a 3-stage symmetric Clos network which includes a first or input stage, a second or center stage, and a third or output stage.

In general, the non-blocking characteristic of a Clos network is dependent on the number of center stage nodes within the network. Two types of non-blocking Clos networks are a rearrangeable non-blocking network and a strictly non-blocking network. Rearrangeable non-blocking occurs when a desired connection is blocked when a current set of existing connections is in place, but the current set of existing connections within the network may be moved to different center stage nodes such that an appropriate center stage node may become available to facilitate the desired, e.g., new, connection. Typically, a rearrangeable non-blocking 3-stage network requires more center stage nodes than required by a blocking network. A strictly non-blocking network allows every requested connection to be made without having to rearrange a current set of existing connections. In order to implement a strictly non-blocking 3-stage network, a required number of center stage nodes is at least twice the number of input stage nodes, e.g., for a unicast request in a 3-stage Clos network, and may be much higher, e.g., for a multicast request in a 3-stage Clos network.

The number of center stage nodes needed to implement a strictly non-blocking network which supports multicast requests is often prohibitory and, hence, impractical to implement. As such, a rearrangeable non-blocking network may be implemented to support multicast requests, even though a rearrangeable non-blocking network may be slower than desired. A rearrangeable non-blocking network may enable the number of center stage nodes needed to support multicast requests to be reduced.

One solution to creating a non-blocking network involves a double-balancing technique as described in U.S. patent application Ser. No. 10/086,517, filed Feb. 28, 2002, and entitled "Multi-Stage Switching for Networks," which is incorporated herein by reference in its entirety. Using a double-balancing technique, a substantially even distribution of load may be achieved within a network such as a six-chip network. FIG. 1 is a diagrammatic representation of a six-node or a six-chip network which supports mixed cast requests. A network 10 includes an input stage 14a which includes input stage nodes 18a, 18b. Network 10 also includes a center stage 14b which has center stage nodes 18c, 18d, as well as an output stage 14c which has output stage nodes 18e, 18f. Nodes 18a, 18b each have 'n' input ports 20, while nodes 18e, 18f each have 'n' output ports 24.

Nodes 18a, 18b are linked to nodes 18c, 18d by input stage to center stage links 22a-d, while nodes 18c, 18d are linked to nodes 18e, 18f by center stage to output stage links 22e-h. Each link 22 has a capacity defined as 'n/2'. Further, each node 18a, 18b is connected to each node 18c, 18d by 'n/2' links 22, while each node 18c, 18d is connected to each node 18e, 18d by 'n/2' links 22. It should be appreciated that when there is exactly one link 22 between successive nodes 18, e.g., one link 22a between node 18a and node 18c as well as one link 22e between node 18c and node 18e, then network 10 is a Clos network.

By using a double-balancing algorithm or technique, a substantially even distribution of load across both input stage to center stage links 22a, 22b and center stage to output stage links 22c, 22d may be achieved. That is, an attempt is made to balance the load with respect to links 22 between input stage 14a and center stage 14b and with respect to links 22 between center stage 14b and output stage 14c. For multicast requests, the double-balancing algorithm picks a single center stage node 18c, 18d for use in routing a signal or information between an input port 20 and an output port 24.

As shown in FIG. 2, for a particular multicast request that is to reach output nodes 18e, 18f, a single center stage node 18c is chosen to provide the request to output nodes 18e, 18f. For clarity, links 22 which are not used to route the particular multicast request, input ports 20, and output ports 24 have not been shown in FIG. 2. When center stage node 18c is chosen to support a multicast request which is provided through input stage node 18a on link 22a, links 22e, 22f are used to pass the multicast request to output stage nodes 18e, 18f, respectively. Even in the event that links 22a, 22f, for example, may have less available capacity than links 22b, 22h of FIG. 1, links 22a, 22f may be used to route a multicast request when it is determined that overall, using center stage node 18c allows for a more even distribution of load than using center stage node 18d.

If center stage 14b has some extra capacity, then the use of a single center stage node 18c, 18d to support multicast requests is generally effective in enabling a relatively even distribution of load to occur. When there is effectively no extra center stage capacity, and a multicast request has a fanout, then a limitation of having to route the request through a single center stage node 18c, 18d increases the chances of blocking. Multicast fanout is generally associated with the number of output nodes a given multicast request is destined to, and has a rate that may be a number between one and the total number of output nodes in a system. Hence, the overall performance associated with routing requests may be adversely affected by the lack of extra center stage capacity.

FIG. 3 is a process flow diagram which illustrates the steps associated with one method of routing requests through a Clos-like network such as network 10 of FIG. 1. A method 300 begins at step 304 in which a double-balancing algorithm is used to route requests through a common center node. Specifically, a double-balancing algorithm is used to route each unicast request through a center stage node that is deemed to be most suitable and to route each multicast request through a single center stage node.

When a new request, which may be a unicast request or a multicast request, is received in step 308, the new request is added into a table of requests in step 312, thereby updating the table of requests to include substantially all requests which are routed through the network. Once the table of requests is updated, then substantially all requests in the table of requests may effectively be rerouted in step 316 using a double-balancing algorithm. In other words, substantially every time a new request is received and added to the table of request, all requests in the table of requests are routed using a double-balancing algorithm in an effort to balance the load across all internal links of the network. Using a double balancing algorithm, center stage node candidates are selected by computing a cost which reflects the change in the utilization of links. For each request, the costs on the links between center stage and output stage nodes are computed for each center stage node. The node with the best cost is generally chosen for use in routing a request. When more than one candidate node is available, the cost on links between an input stage and the center stage are computed, and the candidate with the best associated cost is selected for use in routing the request. After all requests in the table of requests are routed, method 300 is completed.

In general, a double-balancing algorithm is effective in enabling mixed cast requests to be efficiently routed through a relatively small Clos-like network. However, as discussed above, the use of a double-balancing algorithm which uses a common center stage node to route a multicast request may sometimes result in a higher blocking rate, as for example when the Clos-like network is relatively large and only one center stage node may be used to route the request.

Some true Clos networks use multicast routing algorithms which use multiple center stage nodes, while trying to substantially minimize the number of center stage nodes used without significantly exceeding a desired blocking rate. Such algorithms are effective in routing multicast requests through a true Clos network, but are relatively ineffective in routing unicast requests. Hence, when a preponderance of requests to be routed through a true Clos network that supports mixed cast requests are unicast requests, such multicast routing algorithms result in relatively poor bandwidth utilization within the true Clos network. The poor performance in terms of bandwidth utilization may often be attributed to the fact that in a true Clos network, it is generally not possible to perform balancing, due to the fundamental nature of such a network. Since the link capacities are such that links are either available or not available, there is effectively no degree of availability associated with the links, which renders balancing to unbeneficial.

Therefore, what is needed is a method and an apparatus for minimizing the number of center stage nodes needed in a Clos-like network to achieve acceptable performance for both unicast and multicast requests. That is, what is desired is a system which enables mixed cast requests to be efficiently routed through a 3-stage Clos-like network with a substantially equal number of input nodes and center stage nodes such that an acceptable performance level, e.g., an acceptable blocking rate, is achieved.

SUMMARY OF THE INVENTION

The present invention relates to a system for efficiently routing mixed cast requests through a Clos-like network. According to one aspect of the present invention, a method for processing a routing request within a network system includes computing costs associated with input links between a center stage and an input stage and computing costs associated with output links between the center stage and an output stage. The method also includes comparing the costs associated with the input links and the costs associated with the output links to identify a first input link, a first output link, and a second output link. The first output link is associated with a first center stage node and the second output link is associated with a second center stage node. The request is routed using the first input link, the first output link, and the second output link and, hence, both the first center stage node and the second center stage node.

In one embodiment, comparing the costs includes identifying the first input link as having a best cost of the costs associated with the input links and identifying the first output link and the second output link as having the best costs of the costs associated with the output links. In another embodiment, computing the costs associated with the input links includes computing link loadings associated with the input links, and computing the costs associated with the output links includes computing link loadings associated with the output links.

By allowing multicast requests to be routed through a network, e.g., a network which supports mixed cast requests, using more than one center stage node when the use of more than one center stage node is more efficient than using a single center stage node, a relatively high level of performance may be maintained in the network. Taking both the link loadings associated with input internal links to nodes in a center stage and the link loadings associated with output internal links to nodes in an output stage into consideration enables both unicast and multicast requests to be routed through a network generally without resulting in a high incidence of blocked requests.

According to another aspect of the present invention, a method for routing a request through a 3-stage network that includes an input stage, a center stage, and an output stage involves computing link loadings associated with a plurality of input links which link the input stage to the center stage, as well as computing link loadings associated with a plurality of output links which link the center stage to the output stage. The method also includes determining when the request specifies more than one output node in the output stage, and comparing the link loadings associated with the plurality of input links to identify a first best cost input link and a second best cost input link when it is determined that the request specifies more than one output node. The first best cost input link is associated with a first center stage node and the second best cost input link is associated with a second center stage node. Finally, the method includes routing the request using the first best cost input link and the second best cost input link when it is determined that the request specifies more than one output node.

In one embodiment, the method includes determining when both the first center stage node and the second center stage node are to be used to route the request by comparing the link loadings associated with the plurality of input links and comparing the link loadings associated with the plurality of output links to determine when it is determined that the request specifies more than one output node. In such an embodiment, the method may also include comparing the link loadings associated with the plurality of input links and the link loadings associated with the plurality of output links to identify the first best cost input link, a third best cost output link of the plurality of output links, and a fourth best cost output link of the plurality of output links when it is determined that the request specifies more than one output node and when it is determined that both the first center stage node and the second center stage node are not to be used to route the request to identify the first best cost input link. The third best cost output link and the fourth best cost output link are associated with the first center stage node, and the request is routed using the first best cost input link, the third best cost output link, and the fourth best cost output link.

These and other advantages of the present invention will become apparent upon reading the following detailed descriptions and studying the various figures of the drawings.

BRIEF DESCRIPTION OF THE DRAWINGS

The invention may best be understood by reference to the following description taken in conjunction with the accompanying drawings in which.

DETAILED DESCRIPTION OF THE EMBODIMENTS

It is necessary for many Clos-like networks to have the ability to support mixed cast requests, e.g., both unicast and multicast requests. When a double-balancing technique is used to route mixed cast requests through a Clos-like network, as for example a six-node Clos-like network, the load associated with the requests may be routed relatively evenly. However, for larger networks or networks with substantially no extra center stage capacity, the performance, e.g., in terms of the efficient utilization of bandwidth, associated with multicast requests may be compromised. The efficient algorithms for rearranging unicast signals in a true Clos network are generally relatively ineffective in routing multicast requests.

An algorithm which allows mixed cast requests to be routed using a double balancing technique that enables a multicast request to be routed using more than one center stage node within a Clos-like network enables good performance to be achieved in routing both multicast and unicast requests. Such an algorithm, which may be implemented as code devices on computing devices associated with nodes, allows mixed cast requests to be efficiently routed in both smaller and larger Clos-like networks while substantially minimizing incidences of blockage and while substantially maximizing the saturation rate of the overall switch fabric. Hence, the performance associated with routing unicast requests and multicast requests is relatively high, even within larger networks, as well as when requests are either predominantly unicast or predominantly multicast.

Figure 1:
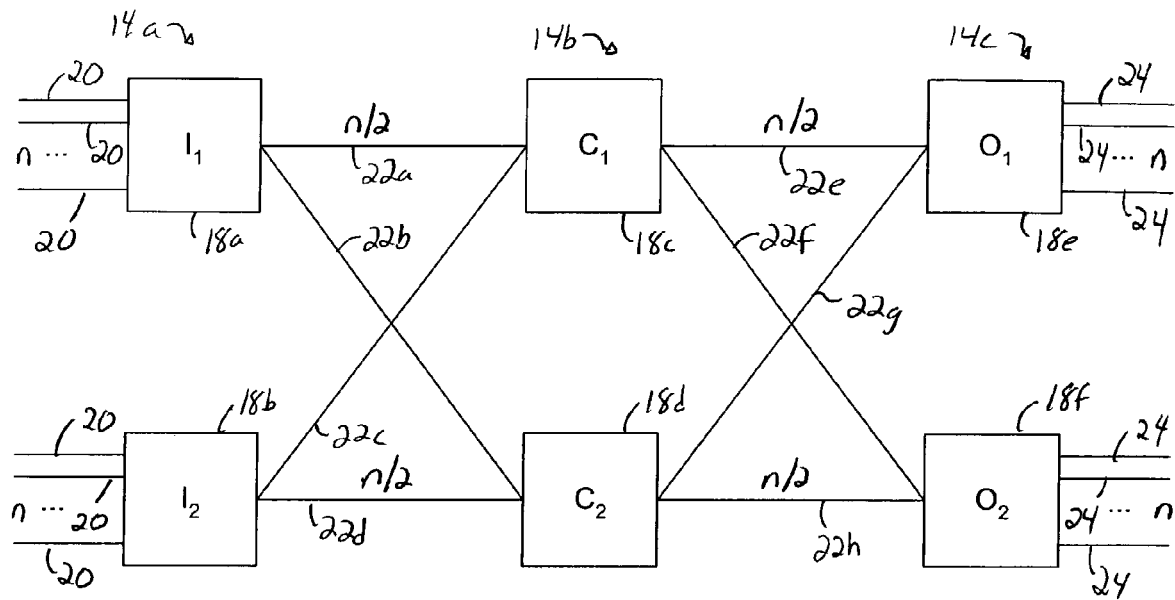
FIG. 1 is a diagrammatic representation of a six-node or a six-chip network which supports mixed cast requests.
Figure 2:
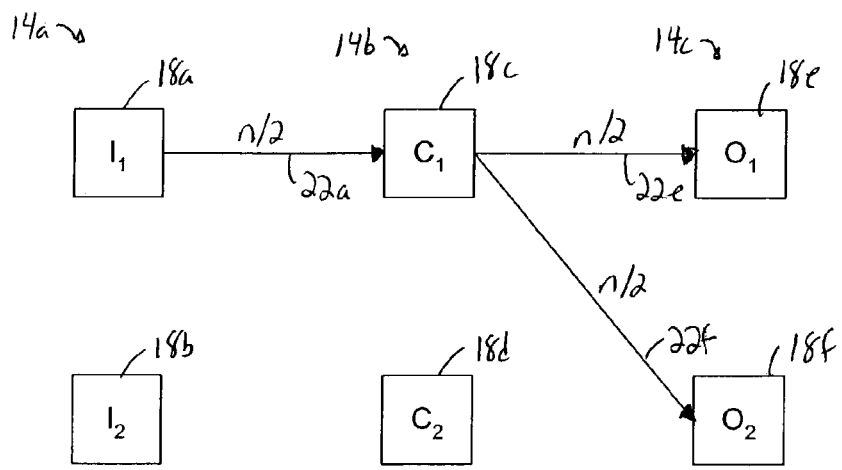
FIG. 2 is a diagrammatic representation of a multicast request being routed through a network, i.e., network 10 of FIG. 1.
Figure 3:
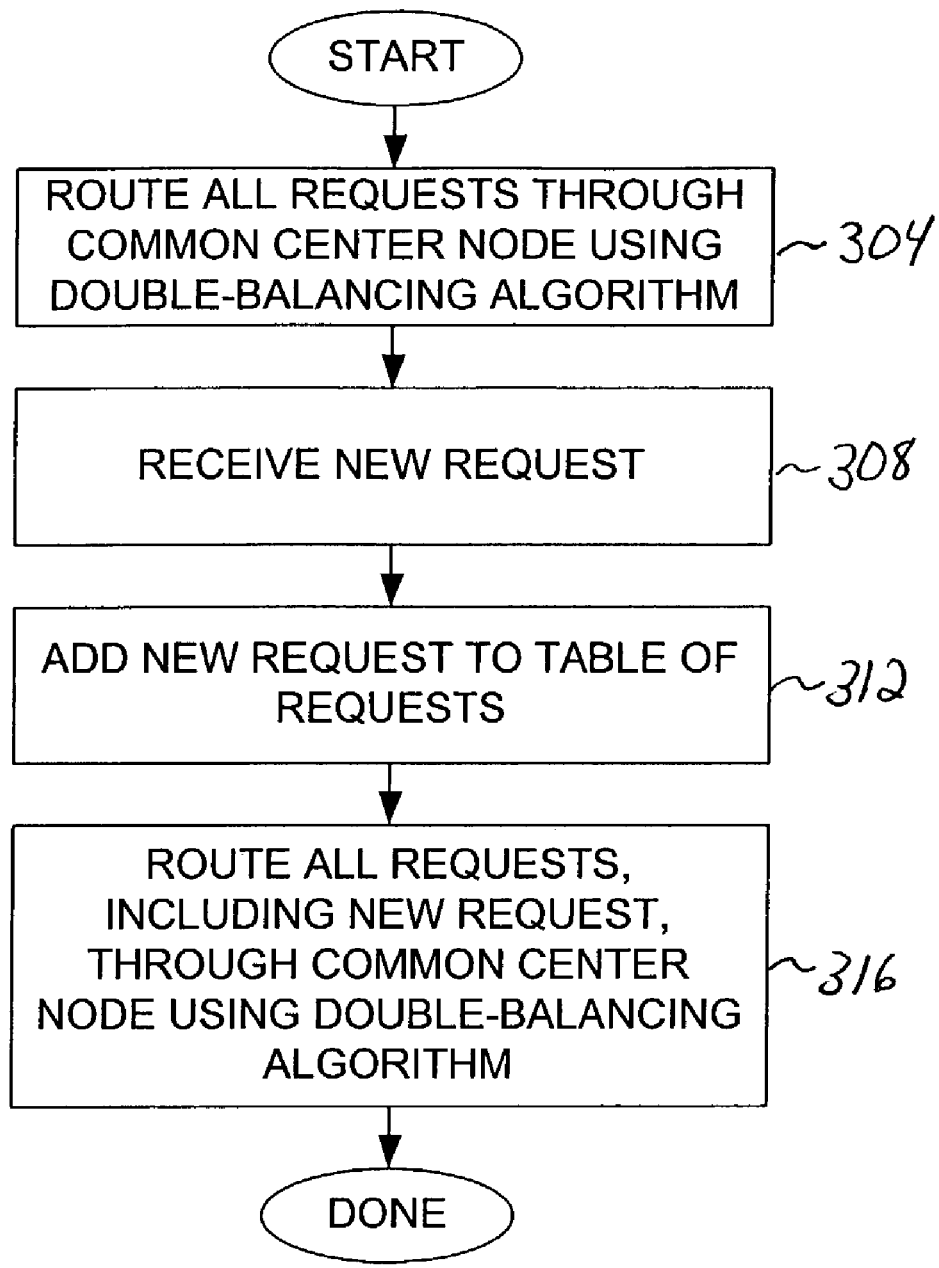
FIG. 3 is a process flow diagram which illustrates the steps associated with one method of routing requests through a Clos-like network.
Figure 4:
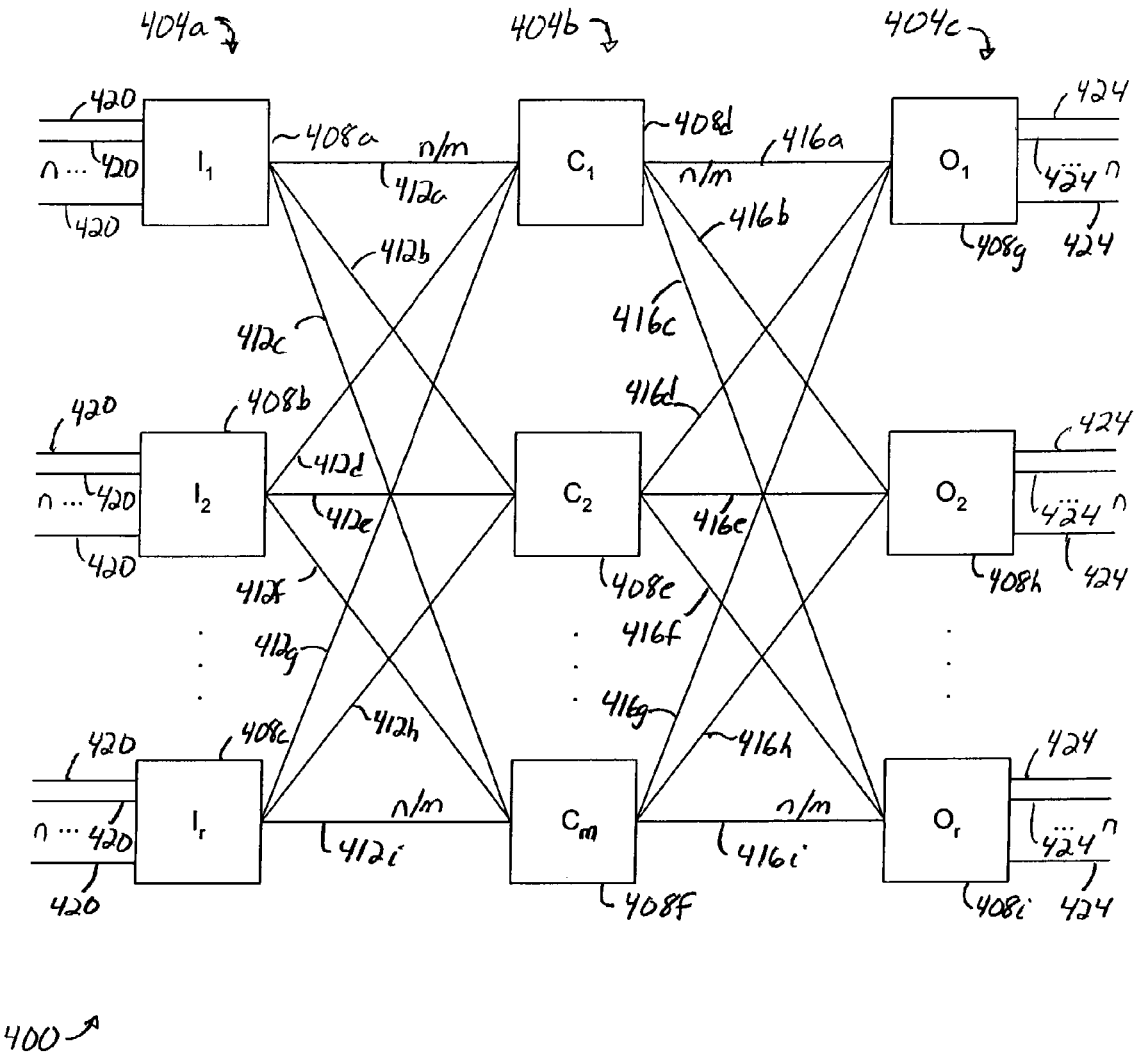
FIG. 4 is a diagrammatic representation of a 3-stage Clos-like network in accordance with an embodiment of the present invention.
Figure 5A:
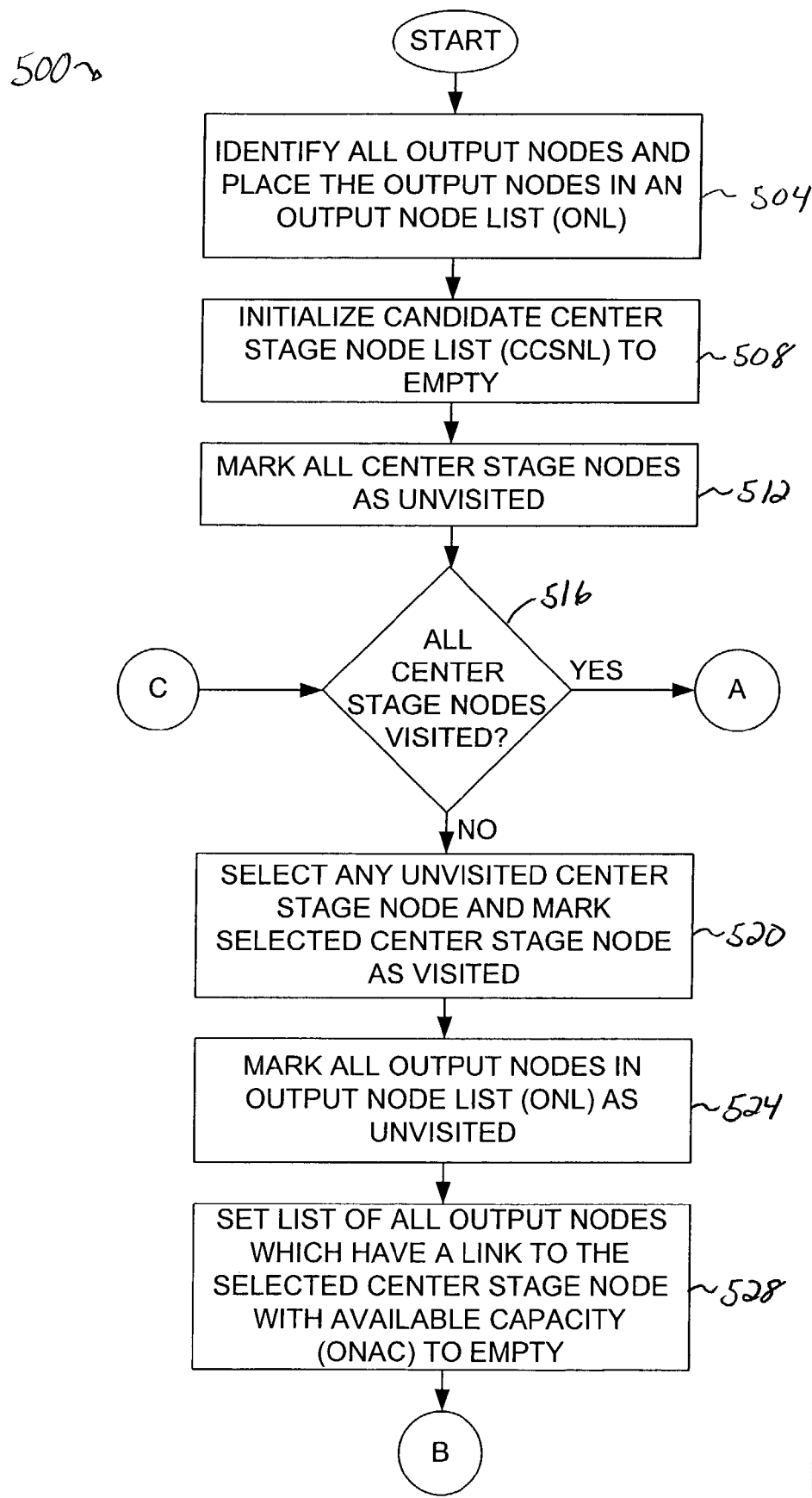
FIGS. 5a-f are a process flow diagram which illustrates the steps associated with one method of routing a request through a Clos-like network in accordance with an embodiment of the present invention.
Figure 5B:
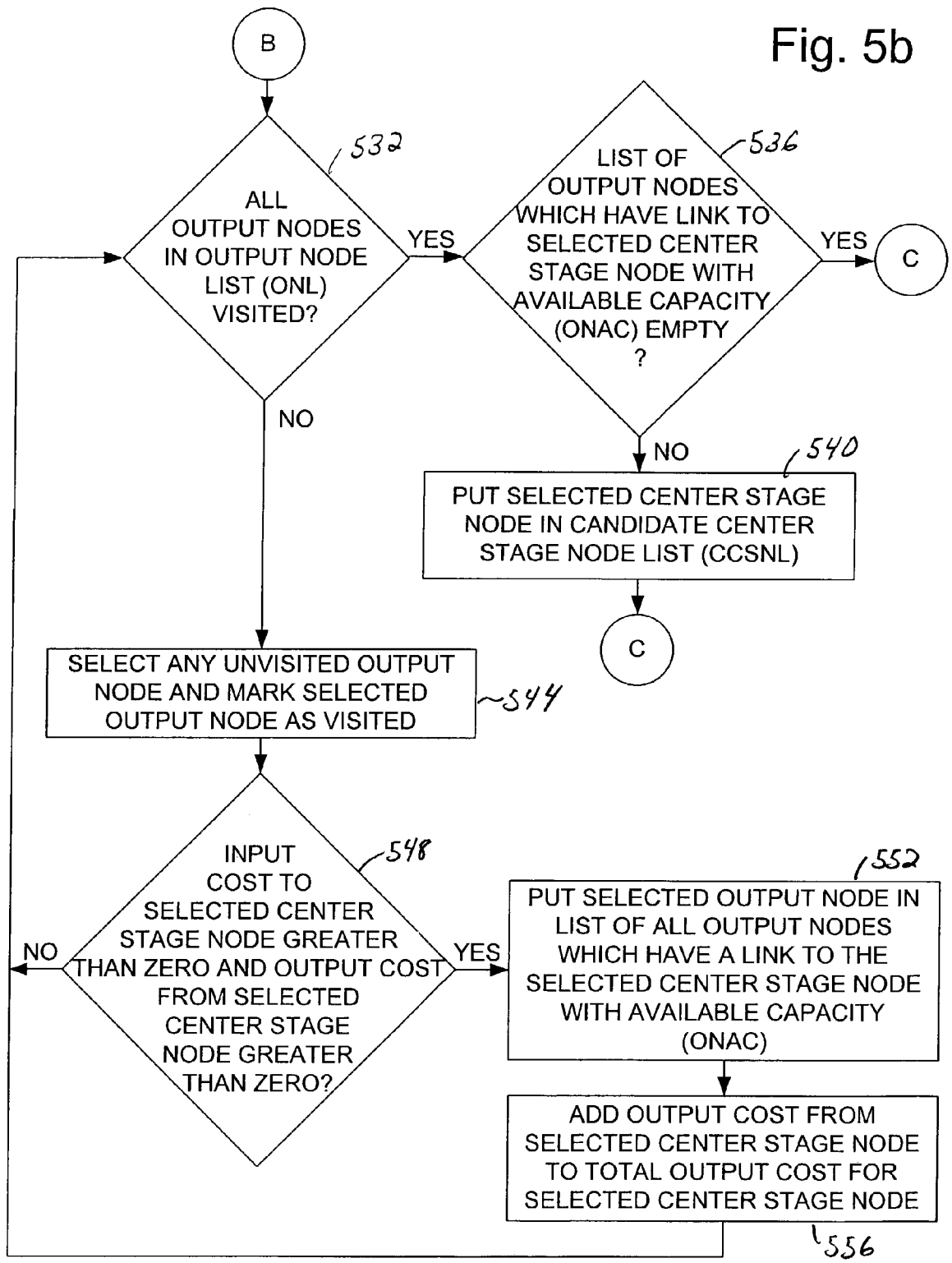
Figure 5C:
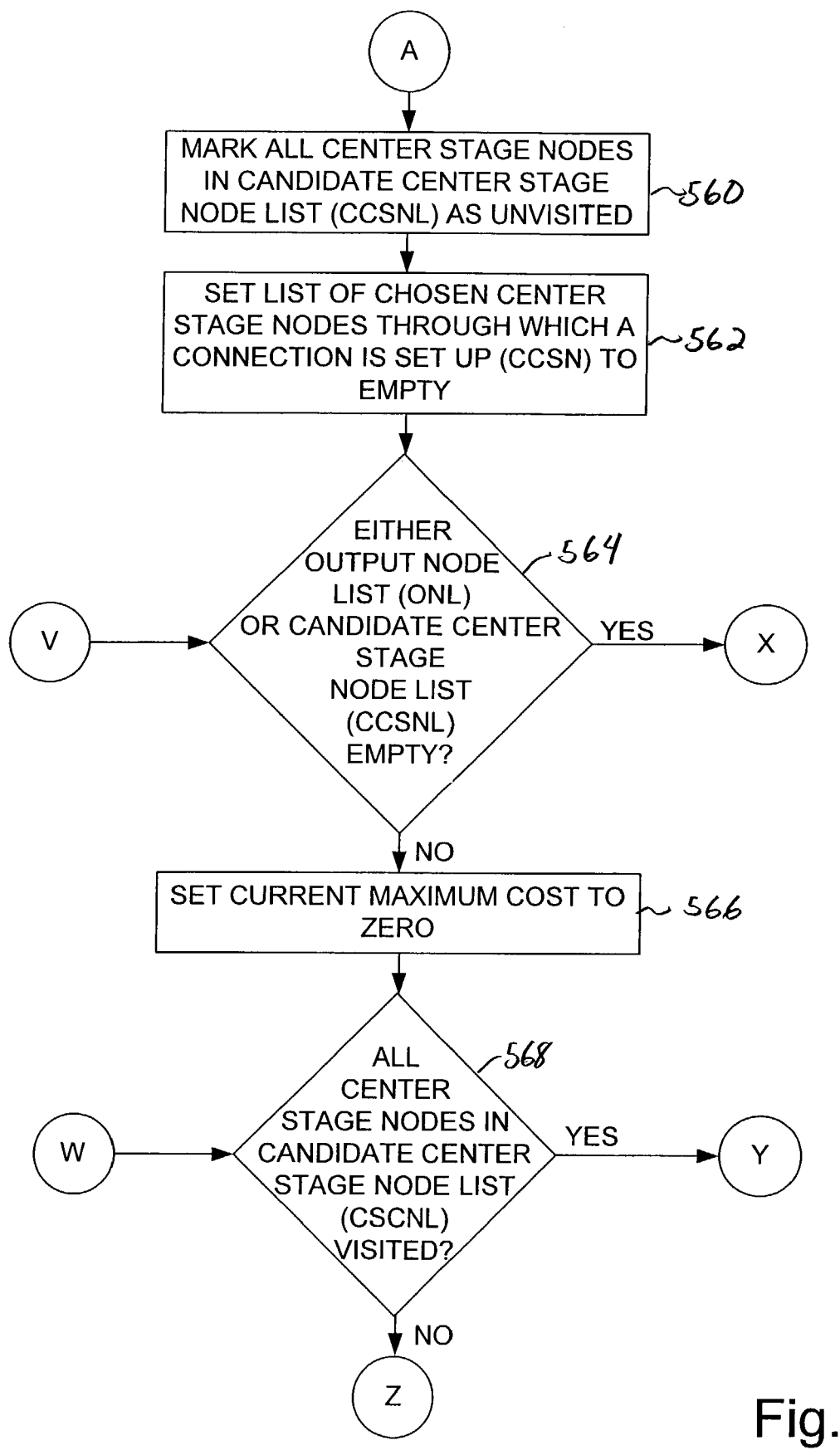
Figure 5D:
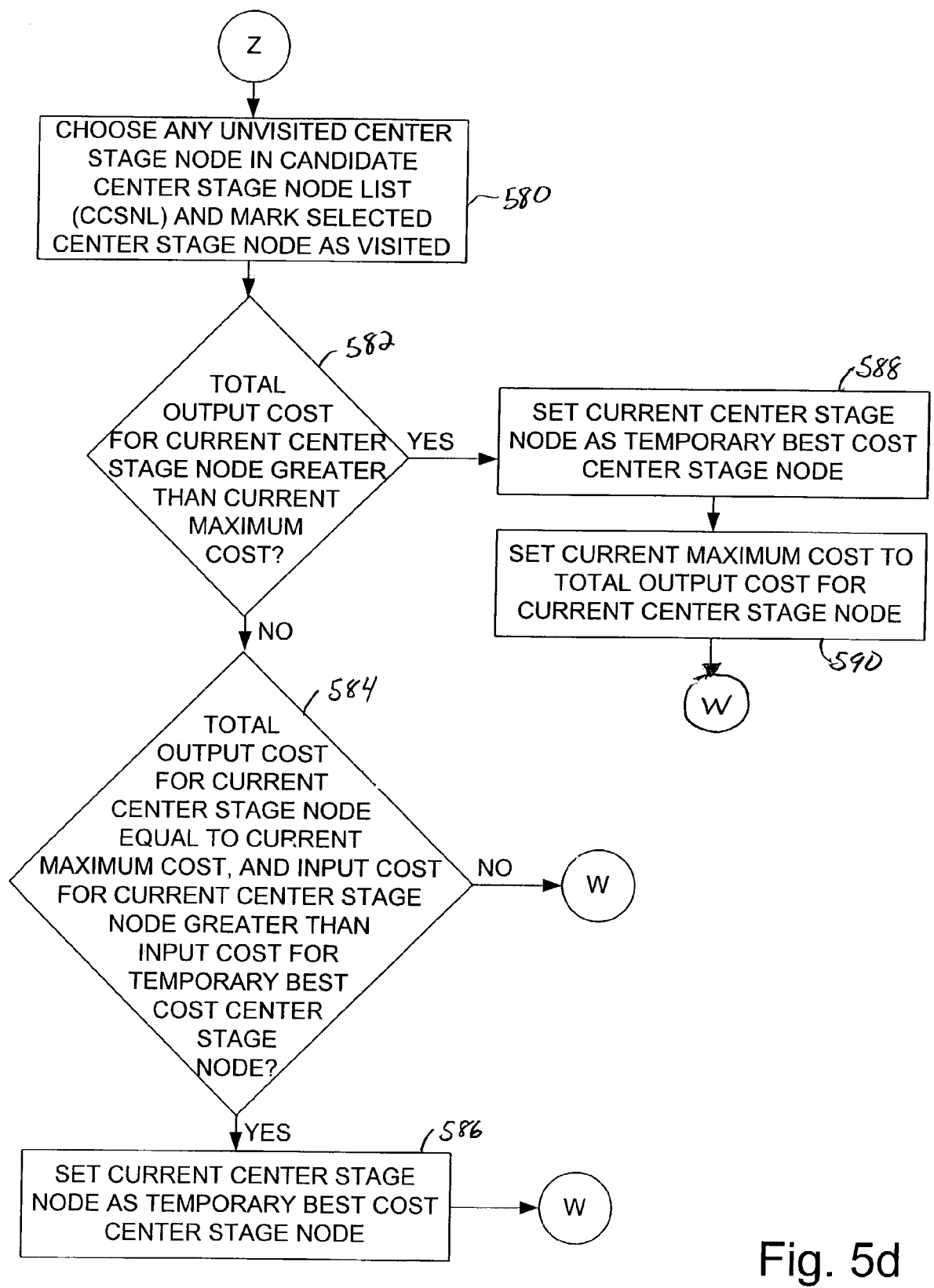
Figure 5E:
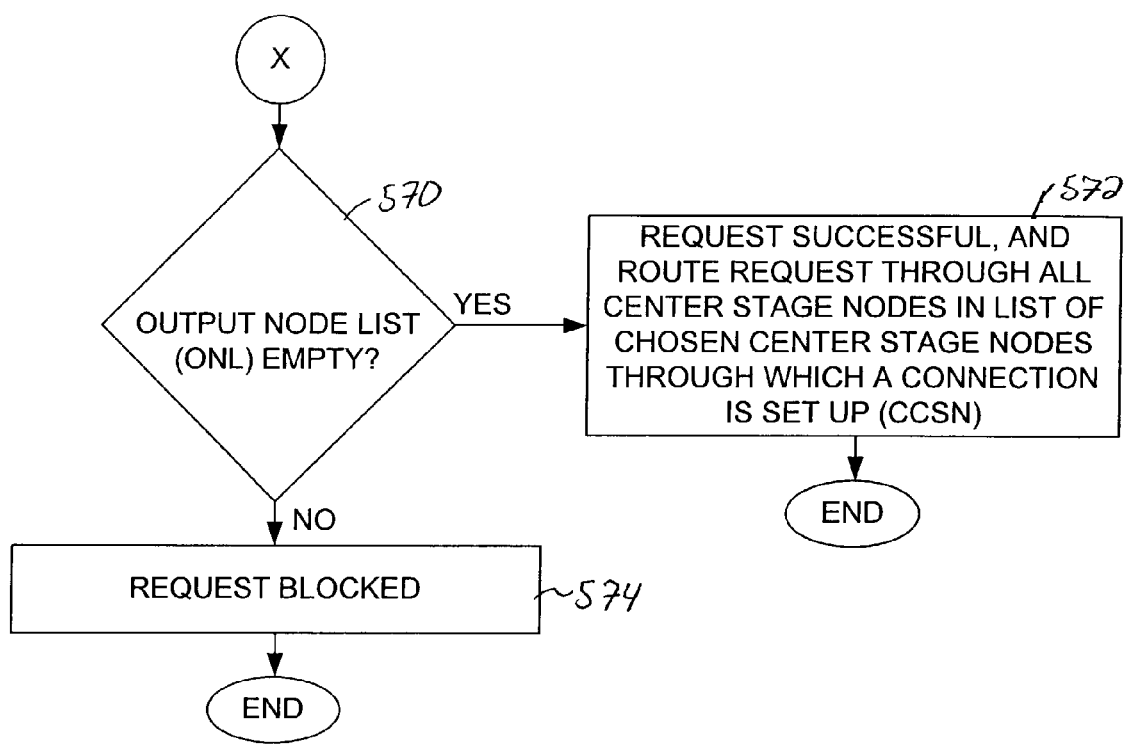
Figure 5F:
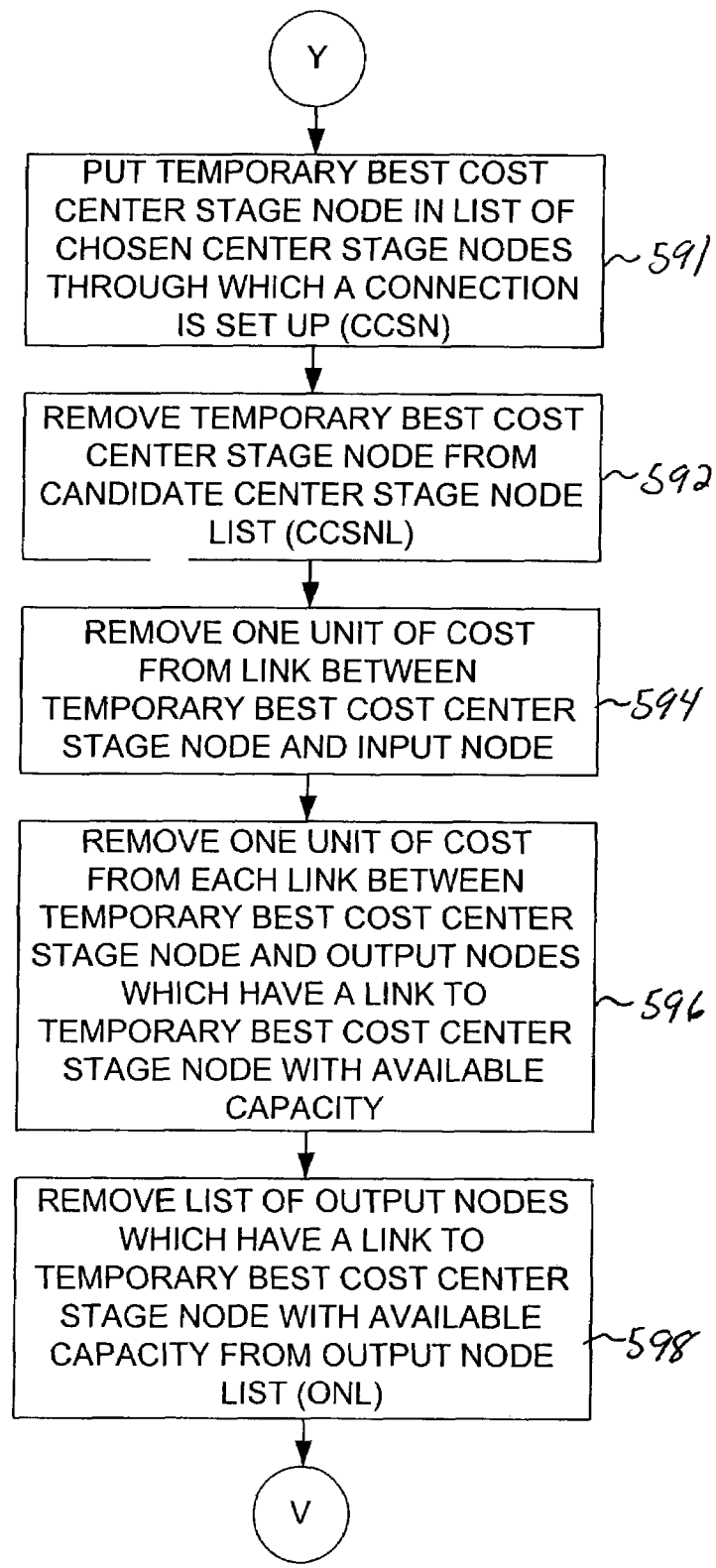

In one embodiment, an algorithm which enables multicast requests to be routed using a double-balancing technique which allows multiple center stage nodes to be used may be applied within a 3-stage Clos like optical network with substantially any number of nodes, input ports, and output ports. With reference to FIG. 4, a 3-stage Clos-like network will be described in accordance with an embodiment of the present invention. A 3-stage Clos-like network 400 includes stages or columns 404 of nodes 408. A first stage 404a is an input stage, a second stage 404b is a center stage, and a third stage 404c is an output stage. Each node 408a-c in input stage 404a has a link 412 to each node 408d-f in center stage 404b. For example, a first node 408a in input stage 404a has links 412a-c to each node 408d-f in center stage 404b, respectively. Similarly, each node 408d-f in center stage 404b has a link 416 to each node 408g-i in output stage 404c.

Network 400 may be considered to be a symmetric network when input state 404a and output stage 404c are effectively mirror images, i.e., when input stage 404a and output stage 404c have the same number of nodes 408 of the same size. In the embodiment as shown, input stage 404a and output stage 404c each have 'r' nodes, while center stage 404b includes 'm' nodes. The size of each node 408a-c in input stage 404a is such that each node 408a-c has 'n' inputs 420 and 'm' outputs which correspond to input and output ports, respectively. When network 400 is a symmetric network, then the size of each node 408g-i in output stage 404c is such that each node 408g-i has 'm' inputs and 'n' outputs 424.

In general, 'n' is a multiple of 'm.' It should be appreciated that 'm' outputs of each node 408a-c are coupled to links 412 which are inputted to nodes 408d-f in center stage 404b. Likewise, the 'r' outputs of each node 408d-f in center stage 404b are coupled to the 'm' inputs of each node 408g-i in output stage 404c for a symmetric network. The number of links 412 which connect each node 408a-c in input stage 404a to each node 408d-f in center stage 404b, and the number of links 416 which connect each node 408d-f in center stage 404b to each node 408g-i in output stage 404c, is 'n' divided by 'm,' or 'n/m.' Furthermore, the capacity of each link 412, 416 is 'n' divided by 'm,' or 'n/m.'

When 'n' is substantially equal to 'm,' then network 400 is a true Clos network. Within a true Clos network, the capacity of each link 412, 416 is one. Further, each node 408 has a number of inputs that is equal to a number of outputs. In one embodiment, 'm' is substantially equal to 'r,' i.e., the number of nodes 408 in each stage 404 is the same. When 'm' is substantially equal to 'r,' each node 408 is effectively a square, as each node 408 has an equal number of input ports and output ports. Each node 408, when square, may be used as a strictly non-blocking network in a smaller system and, within a larger network such as network 400, may have a relatively low blocking rate.

The number of nodes 408d-f in center stage 404b may generally vary widely relative to the number of nodes 408a-c in input stage 404a, e.g., 'm' is not necessarily equal to 'r.' However, when substantially all nodes 408 are squares of the same size, when 'm' is greater than 'r,' the capacity of each node 408d-f in center stage 404b is not completely utilized. By way of example, if 'm' has a value that is approximately twice the value of 'r,' then approximately half of the ports in each node 408d-f in center stage 404b may remain unused. As 'm' increases, the capacity of links 412, 416 decreases, since the capacity is inversely proportional to 'm,' as previously discussed. Hence, increasing the number of nodes 408d-f in center stage 404b while a number of nodes 408a-c and 408g-i remains approximately the same may in some cases result in a higher blocking rate. It should be appreciated, though, that when network 400 is a true Clos network, increasing the number of nodes 408d-f in center stage 404b may lower the blocking rate.

Network 400 has a working environment that supports unicast and multicast requests. In some instances, however, network 400 may receive a sequence of requests that are substantially all unicast requests. During such a period, network 400 may effectively act as a nonblocking network. To route a unicast request, a single center stage node 408d-f is chosen for use in routing the unicast request. Once the center stage node 408d-f is selected, a path may be set for the =request. To route a multicast request, on the other hand, either one center stage node 408d-f or multiple center stage nodes 408d-f may be selected for use.

In one embodiment, a routing technique is arranged to maintain a balance on the utilization of link capacity for both links 412 and links 416. Such a double balancing technique enables load balancing to occur with respect to both the load associated with links 416 and the load associated with links 412, and enables multicast requests to be routed through more than one center stage node 408d-f. FIGS. 5a-f are a process flow diagram which illustrates the steps associated with one method of routing a request through a Clos-like network in accordance with an embodiment of the present invention. A process 500 of routing a request, as for example a request received by a network administrator associated with a network, begins at step 504 in which substantially all output nodes in the network that are associated with the request are identified and placed in an output node list (ONL). When a request is a unicast request, then the output node list may include a single output node. Alternatively, when a request is a multicast request, then the output node list may include a plurality of output nodes. Hence, identifying the output nodes associated with the request generally entails determining whether the request is a unicast request or a multicast request.

Once the output nodes are identified, a candidate center stage node list (CCSNL) is initialized to empty in step 508. Initializing the candidate center stage node list (CCSNL) to empty effectively readies the candidate center stage node list (CCSNL) to accept candidate center stage nodes, or center stage nodes which may be suitable for use in routing the request. In step 512, substantially all center stage nodes are marked as unvisited. After the center stage nodes are marked as being unvisited, it is determined in step 516 if substantially all center stage nodes have been visited. If it is determined that not all center stage nodes have been visited, process flow moves to step 520 in which an unvisited center stage node is selected and marked as visited. It should be appreciated that substantially any unvisited center stage node may be selected, and that such a selection may be based on any suitable criterion.

Output nodes in the output node list (ONL) are marked as unvisited in step 524. Then, in step 528, a list of all output nodes which have a link to the selected center stage node, i.e., the center stage node marked as visited in step 520, with available capacity (ONAC) is set to empty. After the list of all output nodes which have a link to the selected center stage node with available capacity (ONAC) is set to empty, it is determined in step 532 whether substantially all output nodes in the output node list (ONL) have been visited.

If it is determined in step 532 that not all output nodes in the output node list (ONL) have been visited, an unvisited output node is selected in step 544 and marked as visited. Once the selected output node is marked as visited, a determination is made in step 548 regarding whether an input cost to the selected center stage node is greater than zero and, further, whether the output cost from the selected center stage node is greater than zero. The input cost to the selected center stage node is, in one embodiment, defined as the available capacity associated with a link from an input node to the selected center stage node. The output cost from the selected center stage node may be defined as the available capacity associated with a link from the selected center stage node to the selected output node. It should be appreciated that the input cost and the output cost used in the determination made in step 548 may be an input cost or link loading associated with a particular link and an output cost associated with another particular link.

When it is determined in step 548 that either the input cost to the selected center stage node is less than or equal to zero or the output cost from the selected center stage node is less than or equal to zero, process flow returns to step 532 in which it is determined whether all output nodes in the output node list (ONL) have been visited. Alternatively, if it is determined in step 548 that both the input cost to the selected center stage node and the output cost from the selected center stage node are greater than zero, the indication is that an input link and an output link have available capacity. Accordingly, in step 552, the selected output node is placed in the list of all output nodes which have a link to the selected center stage node with available capacity (ONAC). Then, in step 556, the output cost from the selected center stage node is added in step 556 to the total output cost for the selected center stage node. Once the total output cost for the selected center stage node is effectively updated, process flow returns to step 532 and the determination of whether all output nodes in the output node list (ONL) have been visited.

Returning to step 532, if the determination is that all output nodes in the output node list (ONL) have been visited, then it is determined in step 536 whether the list of output nodes which have a link to the selected center stage node with available capacity (ONAC) is empty. That is, it is ascertained whether there are other output nodes which have an available link to the selected center stage node. In the event that it is determined that the list of output nodes which have a link to the selected center stage node with available capacity (ONAC) is empty, then process flow returns to step 516 in which it is determined if all center stage nodes have been visited.

Alternatively, if it is determined in step 536 that the list of output nodes which have a link to the selected center stage node with available capacity is not empty, then the selected center stage node is placed in the candidate center stage node list (CCSNL) in step 540. Then, process flow returns to step 516 in which a determination is made as to whether all center stage nodes have been visited.

In step 516, if the determination of whether all center stage nodes have been visited is affirmative, then the center stage nodes included in the candidate center stage node list (CCSNL) are marked as unvisited in step 560. Once the center stage nodes are marked, a list of chosen center stage nodes through which a connection is set up (CCSN) is set to empty in step 562, and a determination is made in step 564 as to whether either the output node list (ONL) or the candidate center stage node list (CCSNL) is empty in step 564.

When it is determined in step 564 that either the output node list (ONL) or the candidate center stage node list (CCSNL) is empty, then a determination is made in step 570 to determine if it is the output node list (ONL) that is empty. When it is determined that the output node list (ONL) is empty, then the request is determined to be successful in step 572, and the request is routed through substantially all center stage nodes in the list of chosen center stage nodes through which a connection is set up (CCSN). In general, the request is routed through any number of center stage nodes. That is, the number of center stage nodes through which the request is routed may vary widely depending upon the link capacities of the links associated with the center stage nodes. For example, a multicast request may be routed through more than one center stage node when the link capacities are such that the best performance is associated with using a plurality of center stage nodes to route the multicast request. After the request is routed, the process of routing a request is completed.

If, on the other hand, the determination in step 570 is that it is not the output node list (ONL) that is empty, the implication is that the candidate center stage node list (CCSNL) is empty. In other words, it is determined that there are no suitable center stage nodes through which a request may be routed. As such, the request is blocked in step 574, and the process of routing a request is terminated.

Returning to step 564, if it is determined that neither the output node list (ONL) nor the candidate center stage node list (CCSNL) is empty, the current maximum cost is set to zero in step 566. The current maximum cost is generally a running current maximum of the total output cost between a given center stage node and substantially all output nodes that are reachable through that center stage node. Once the current maximum cost is set to zero, it is determined in step 568 whether substantially all center stage nodes in the candidate center stage node list (CSCNL) have been visited.

When the determination in step 568 is that substantially all center stage nodes in the candidate center stage node list (CSCNL) have been visited, then a temporary best cost center stage node is placed in step 591 in the list of chosen center stage nodes through which a connection is set up (CCSN). The temporary best cost center stage node is then removed from the candidate center stage node list (CCSNL) in step 592. After the temporary best cost center stage node is removed, one unit of cost is removed in step 594 from the link between the temporary best cost center stage node and the input node. In other words, the input cost associated with the link into the temporary best cost center stage node from the input node is effectively decremented.

Once a unit of cost is removed from the link between the temporary best cost center stage node and the input node, a unit of cost is removed from each link between the temporary best cost center stage node and output nodes which have an available link to the temporary best cost center stage node in step 596. That is, the output cost associated with each link with available capacity between the temporary best cost center stage node and a suitable output node is updated. After a unit of cost is removed from each suitable link, output nodes which have an available link to the temporary best cost center stage node are removed from the output node list (ONL) in step 598. From step 598, process flow returns to step 564 in which it is determined whether one of the output node list (ONL) and the candidate center stage node list (CCSNL) is empty.

Referring back to step 568, if it is determined that substantially all center stage nodes in the candidate center stage node list (CSCNL) have not been visited, then an unvisited center stage node in the candidate center stage node list (CCSNL) is chosen in step 580 and marked as visited. Once a center stage node is selected, the selected center stage node may be considered to be the current center stage node, and in step 582, a determination is made as to whether the total output cost for the current center stage node is greater than the current maximum cost. The current maximum cost generally refers to the highest output cost associated with center stage nodes in the candidate center stage node list (CSCNL).

If it is determined that the total output cost for the current center stage node is not greater than the current maximum cost, then process flow moves from step 582 to step 584 in which it is determined if the total output cost for the current center stage node is equal to the current maximum cost. In addition, it is determined if the input cost for the current center stage node is greater than the input cost for the temporary best cost center stage node. In the event that it is determined that the total output cost for the current center stage node is not equal to the current maximum cost and, further, that the input cost for the current center stage node is not greater than the input cost for the temporary best cost center stage node, then process flow returns to step 568 in which it is determined whether substantially all center stage nodes in the candidate center stage node list (CSCNL) have been visited. Alternatively, if it the determination in step 584 is affirmative, then the current center stage node is set as the temporary best cost center stage node in step 586. Then, process flow returns to step 568 in which it is determined whether substantially all center stage nodes in the candidate center stage node list (CSCNL) have been visited.

Returning to step 582, if it is determined that the total output cost for the current center stage node is greater than the current maximum cost, then the indication is that the current center stage node may be a preferred choice over the temporary best cost center stage node for use in routing the request. Accordingly, in step 588, the current center stage node is set as the temporary best cost center stage node. Once the new temporary best cost center stage node is set, the current maximum cost is set to the total output cost for the current center stage node, which is now also the temporary best cost center stage node, in step 590. That is, the current maximum cost is updated to equal the total output cost for the new temporary best cost center stage node. From step 590, process flow returns to step 568 in which it is determined whether substantially all center stage nodes in the candidate center stage node list (CSCNL) have been visited.

Figure 6:
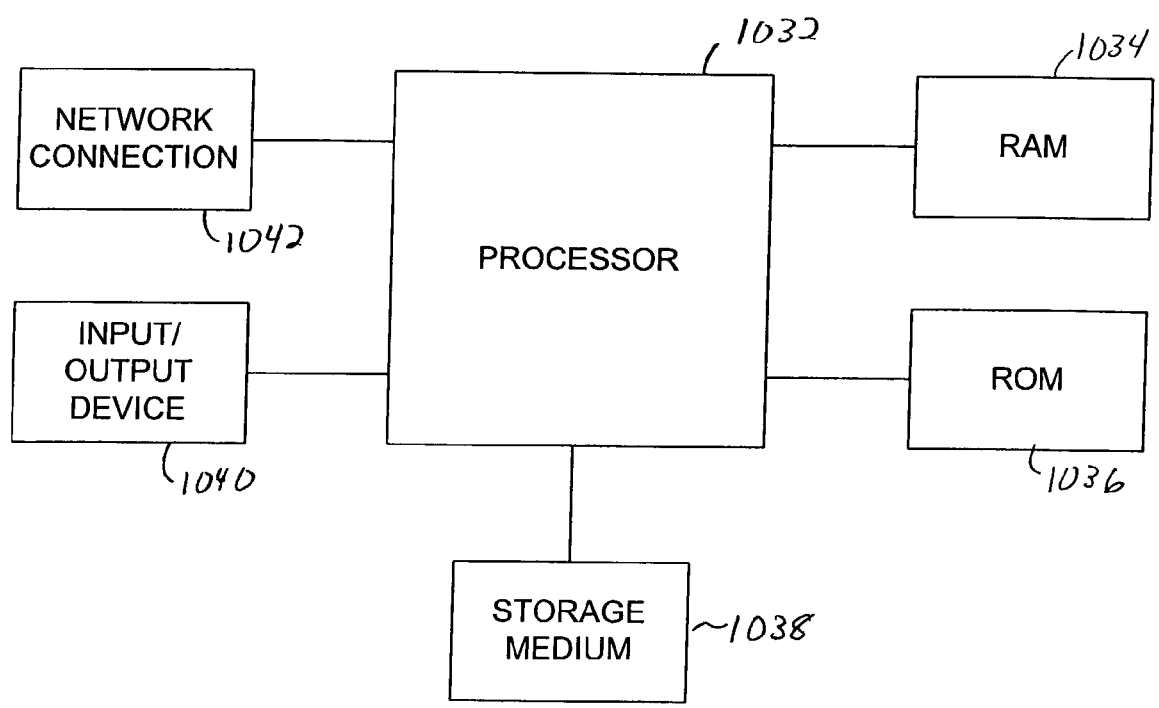
FIG. 6 illustrates a typical, general purpose computing device or computer system suitable for implementing the present invention.

FIG. 6 illustrates a typical, general purpose computing device or computer system suitable for implementing the present invention. A computer system 1030, which may be a node or associated with a node, includes any number of processors 1032 (also referred to as central processing units, or CPUs) that are coupled to memory devices including primary storage devices 1034 (typically a random access memory, or RAM) and primary storage devices 1036 (typically a read only memory, or ROM). ROM acts to transfer data and instructions uni-directionally to the CPU 1032, while RAM is used typically to transfer data and instructions in a bi-directional manner.

CPU 1032 may generally include any number of processors. Both primary storage devices 1034, 1036 may include any suitable computer-readable media. A secondary storage medium 1038, which is typically a mass memory device, is also coupled bi-directionally to CPU 1032 and provides additional data storage capacity. The mass memory device 1038 is a computer-readable medium that may be used to store programs including computer code, data, and the like. Typically, mass memory device 1038 is a storage medium such as a hard disk or a tape which is generally slower than primary storage devices 1034, 1036. Mass memory storage device 1038 may take the form of a magnetic or paper tape reader or some other well-known device. It will be appreciated that the information retained within the mass memory device 1038, may, in appropriate cases, be incorporated in standard fashion as part of RAM 1036 as virtual memory. A specific primary storage device 1034 such as a CD-ROM may also pass data unidirectionally to the CPU 1032.

CPU 1032 is also coupled to one or more input/output devices 1040 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1032 optionally may be coupled to a computer or telecommunications network, e.g., a local area network, an internet network or an intranet network, using a network connection as shown generally at 1042. With such a network connection, it is contemplated that the CPU 1032 might receive information from the network, or might output information to the network in the course of performing the above-described method steps. Such information, which is often represented as a sequence of instructions to be executed using CPU 1032, may be received from and outputted to the network, for example, in the form of a computer data signal embodied in a carrier wave. The above-described devices and materials will be familiar to those of skill in the computer hardware and software arts.

Although only a few embodiments of the present invention have been described, it should be understood that the present invention may be embodied in many other specific forms without departing from the spirit or the scope of the present invention. By way of example, while the use of a routing algorithm which provides double balancing capabilities and allows more than one center stage node to be used to route a multicast request has been described as being suitable for use in a 3-stage Clos-like network, it should be appreciated that such a routing algorithm may be used in substantially any suitable network.

Each node within a network has generally been described as being a single network element. In some embodiments, however, each "node" may be a representation of a network. For instance, with respect to FIG. 4, each node 408 may represent an individual network that is a part of larger overall Clos-like network 400.

A routing algorithm for mixed cast requests may be used with respect to networks which are not intended to support mixed cast requests. That is, the routing algorithm of the present invention may be implemented with respect to a network that either only supports unicast requests or only supports multicast requests.

The number of nodes, links, input ports, and output ports in a Clos-like network may vary widely. Further, the capacities of the links which connect different stages within a Clos-like network may also vary widely depending upon the configuration of the overall network. For example, the capacities of links between an input stage and a center stage, as well as the capacities of links between the center stage and an output stage, may not necessarily be defined as the number of input ports divided by the number of center stage nodes.

While the center stage of a Clos-like network through which mixed cast requests may be routed substantially without significantly adversely affecting the performance of the network has generally been described as having effectively no expansion capabilities, it should be appreciated that the center stage may have some expansion capabilities. In other words, the routing algorithm described above may be implemented within a Clos-like network which has center stage capacity expansion possibilities without departing from the spirit or the scope of the present invention.

Newly received requests may be routed within a network such that previous requests are not affected, i.e., such that previous requests are not rerouted. That is, when a request is received, that request is routed around other requests which have already been routed. In one embodiment, in lieu of routing a new request around previously existing requests, the new request may be added to a table which lists all requests, and each request in the table may be rerouted, along with the new request.

In general, candidate center stage nodes that are used in routing requests have been described as being selected from substantially all center stage nodes within a network. It should be appreciated that candidate center stage nodes may instead be selected from a subset of all center stage nodes without departing from the spirit or the scope of the present invention. By way of example, if one center stage node is known to have links which do not have available capacity, that center stage node may effectively be omitted from consideration as a candidate center stage node substantially before a routing request is processed.

The steps associated with the methods of the present invention may vary widely depending upon, for instance, the requirements of a particular network. Steps may be reordered, changed, removed, and added. Therefore, the present examples are to be considered as illustrative and not restrictive, and the invention is not to be limited to the details given herein, but may be modified within the scope of the appended claims.

What is claimed is:

1. A method for routing mixed cast requests through a 3-stage network, the 3-stage network including an input stage, a center stage, and an output stage, the method comprising:

computing link loadings associated with a plurality of input links which link the input stage to the center stage;

computing link loadings associated with a plurality of output links which link the center stage to the output stage;

determining whether a request specifies more than one output node in the output stage to ascertain the request as a unicast request or multicast request;

comparing the link loadings associated with the plurality of input links to identify a first identified input link and a second identified input link when it is determined that the request specifies more than one output node, the first identified input link associated with a first center stage node in the center stage and the second identified input link associated with a second center stage node in the center stage, including comparing the link loadings associated with the plurality of input links to identify the first identified input link and the second identified input link and comparing the link loadings associated with the plurality of output links when it is determined that the request specifies more than one output node; and routing the request using the first identified input link and the second identified input link when it is determined that the request specifies more than one output node.

2. The method of claim 1 wherein the link loadings comparing step comprises:

comparing the link loadings associated with the plurality of output links to identify a first identified output link and a second identified output link when it is determined that the request specifies more than one output node, the first identified output link associated with the first center stage node and the second identified output link associated with the second center stage node.

3. The method of claim 2 wherein routing the request includes using the first identified output link and the second identified output link when it is determined that the request specifies more than one output node.

4. The method of claim 2 wherein routing the request includes routing the request through the first identified input link and the first identified output link, and routing the request through the second identified input link and the second identified output link.

5. The method of claim 1 wherein routing the request using the first identified input link and the second identified input link when it is determined that the request specifies more than one output node includes routing the request using the first identified input link and the second identified input link when it is determined that both the first center stage node and the second center stage node are to be used to route the request.

6. The method of claim 1 wherein the network is a Clos-like network.

7. A method for routing a request through a 3-stage network, the 3-stage network including an input stage, a center stage, and an output stage, the method comprising:
computing link loadings associated with a plurality of input links which link the input stage to the center stage;
computing link loadings associated with a plurality of output links which link the center stage to the output stage;
determining when the request specifies more than one output node in the output stage;
comparing the link loadings associated with the plurality of input links to identify a first identified input link and a second identified input link when it is determined that the request specifies more than one output node, wherein the first identified input link is associated with a first center stage node in the center stage and the second identified input link is associated with a second center stage node in the center stage;
routing the request using the first identified input link and the second identified input link when it is determined that the request specifies more than one output node, wherein routing the request using the first identified input link and the second identified input link when it is determined that the request specifies more than one output node includes routing the request using the first identified input link and the second identified input link when it is determined that both the first center stage node and the second center stage node are to be used to route the request;
determining when both the first center stage node and the second center stage node are to be used to route the request by comparing the link loadings associated with the plurality of input links and comparing the link loadings associated with the plurality of output links to determine when it is determined that the request specifies more than one output node;
comparing the link loadings associated with the plurality of input links among themselves and the link loadings associated with the plurality of output links among themselves to identify the first identified input link, a third identified output link of the plurality of output links, and a fourth identified output link of the plurality of output links when it is determined that the request specifies more than one output node and when it is determined that both the first center stage node and the second center stage node are not to be used to route the request to identify the first identified input link, the third identified output link and the fourth identified output link being associated with the first center stage node; and
routing the request using the first identified input link, the third identified output link, and the fourth identified output link when it is determined that the request specifies more than one output node and when it is determined that both the first center stage node and the second center stage node are not to be used to route the request to identify the first identified input link.

8. The method of claim 7 wherein the network is a Clos-like network.

9. An apparatus for routing mixed cast requests through a 3-stage network, the 3-stage network including an input stage, a center stage, and an output stage, the apparatus comprising:
means for computing link loadings associated with a plurality of input links which link the input stage to the center stage;
means for computing link loadings associated with a plurality of output links which link the center stage to the output stage;
means for determining whether a request specifies more than one output node in the output stage to ascertain the request as a unicast or multicast request;
means for comparing the link loadings associated with the plurality of input links to identify a first identified input link and a second identified input link when it is determined that the request specifies more than one output node, the first identified input link associated with a first center stage node in the center stage and the second identified input link is associated with a second center stage node in the center stage, including means for comparing the link loadings associated with the plurality of input links to identify the first identified input link and the second identified input link and means for comparing the link loadings associated with the plurality of output links when it is determined that the request specifies more than one output node; and
means for routing the request using the first identified input link and the second identified input link when it is determined that the request specifies more than one output node.

10. The apparatus of claim 9 wherein the means for comparing the link loadings associated with the plurality of output links identifies a first identified output link and a second identified output link when it is determined that the request specifies more than one output node, the first identified output link associated with the first center stage node and the second identified output link associated with the second center stage node, wherein the means for routing the request uses the first identified output link and the second identified output link when it is determined that the request specifies more than one output node.

11. The apparatus of claim 9 wherein the means for comparing the link loadings associated with the plurality of input links to identify the first identified input link and the second identified input link when it is determined that the request specifies more than one output node include means for comparing the link loadings associated with the plurality of input links to identify the first identified input link and the second identified input link when it is determined that both the first center stage node and the second center stage node are to be used to route the request.

12. The apparatus of claim 9 wherein the means for routing the request using the first identified input link and the second identified input link when it is determined that the request specifies more than one output node include means for routing the request using the first identified input link and the second identified input link when it is determined that both the first center stage node and the second center stage node are to be used to route the request.

13. The apparatus of claim 9 wherein the network is a Clos-like network.

14. An apparatus for routing a request through a 3-stage network, the 3-stage network including an input stage, a center stage, and an output stage, the apparatus comprising:
 means for computing link loadings associated with a plurality of input links which link the input stage to the center stage;
 means for computing link loadings associated with a plurality of output links which link the center stage to the output stage;
 means for determining when the request specifies more than one output node in the output stage;
 means for comparing the link loadings associated with the plurality of input links to identify a first identified input link and a second identified input link when it is determined that the request specifies more than one output node, wherein the first identified input link is associated with a first center stage node in the center stage and the second identified input link is associated with a second center stage node in the center stage;
 means for routing the request using the first identified input link and the second identified input link when it is determined that the request specifies more than one output node, wherein the means for routing the request using the first identified input link and the second identified input link when it is determined that the request specifies more than one output node include means for routing the request using the first identified input link and the second identified input link when it is determined that both the first center stage node and the second center stage node are to be used to route the request;
 means for determining when both the first center stage node and the second center stage node are to be used to route the request by comparing the link loadings associated with the plurality of input links and comparing the link loadings associated with the plurality of output links to determine when it is determined that the request specifies more than one output node;
 means for comparing the link loadings associated with the plurality of input links and the link loadings associated with the plurality of output links to identify the first identified input link, a third identified output link of the plurality of output links, and a fourth identified output link of the plurality of output links when it is determined that the request specifies more than one output node and when it is determined that both the first center stage node and the second center stage node are not to be used to route the request to identify the first identified input link, the third identified output link and the fourth identified output link being associated with the first center stage node; and
 means for routing the request using the first identified input link, the third identified output link, and the fourth identified output link when it is determined that the request specifies more than one output node.

15. The apparatus of claim 14 wherein the network is a Clos-like network.

* * * * *

UNITED STATES PATENT AND TRADEMARK OFFICE
CERTIFICATE OF CORRECTION

PATENT NO. : 7,596,135 B1  
APPLICATION NO. : 10/444438  
DATED : September 29, 2009  
INVENTOR(S) : Iovine et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1374 days.

Signed and Sealed this

Twenty-eighth Day of September, 2010

David J. Kappos  
*Director of the United States Patent and Trademark Office*